United States Patent
Giordano

(10) Patent No.: US 8,116,947 B2
(45) Date of Patent: Feb. 14, 2012

(54) SAFETY ARRANGEMENT FOR A VEHICLE USING SEPARATE SENSING AND CONTROL UNITS

(75) Inventor: Francois Giordano, Paris (FR)

(73) Assignee: Autoliv Development AB, Vargarda (SE)

( * ) Notice: Subject to any disclaimer, the term of this patent is extended or adjusted under 35 U.S.C. 154(b) by 729 days.

(21) Appl. No.: 10/531,860

(22) PCT Filed: Oct. 21, 2003

(86) PCT No.: PCT/SE03/01622
§ 371 (c)(1), (2), (4) Date: Nov. 16, 2005

(87) PCT Pub. No.: WO2004/035356
PCT Pub. Date: Apr. 29, 2004

(65) Prior Publication Data
US 2006/0108781 A1 May 25, 2006

(30) Foreign Application Priority Data

Oct. 21, 2002 (GB) .................................. 0224429.1
Dec. 2, 2002 (GB) .................................. 0228054.3

(51) Int. Cl.
*B60R 21/16* (2006.01)
(52) U.S. Cl. .......... 701/45; 701/36; 340/436; 280/728.1
(58) Field of Classification Search ............... 701/36, 701/45; 340/438, 436, 669; 180/271, 274, 180/282; 280/728.1, 734
See application file for complete search history.

(56) References Cited

U.S. PATENT DOCUMENTS

| | | | |
|---|---|---|---|
| 2,365,574 A | 12/1944 | McWane | |
| 4,741,560 A | 5/1988 | Vigneron | |
| 4,836,024 A | 6/1989 | Woehrl et al. | |
| 5,173,614 A | 12/1992 | Woehrl et al. | |
| 5,202,831 A | 4/1993 | Blackburn et al. | |
| 5,419,407 A | 5/1995 | Meyer et al. | |
| 5,428,534 A | 6/1995 | Wetzel et al. | |
| 5,445,412 A | 8/1995 | Gillis et al. | |
| 5,814,897 A | 9/1998 | Ito et al. | |
| 5,928,300 A | 7/1999 | Rogers et al. | |

(Continued)

FOREIGN PATENT DOCUMENTS

DE 19736840 A1 2/1999

(Continued)

OTHER PUBLICATIONS

ColinC, Airbag ECU location??, Dec. 12, 2006, Renault Forums, www.renaultforums.co.uk.*

(Continued)

*Primary Examiner* — Khoi Tran
*Assistant Examiner* — Spencer Patton
(74) *Attorney, Agent, or Firm* — Brinks Hofer Gilson & Lione

(57) ABSTRACT

A vehicle safety arrangement having a sensor unit (7) comprising at least one sensor (8, 9) responsive to acceleration; an actuator (13) for activating a safety device, the actuator being located remotely from the sensor unit; and a control unit (2) located remotely from the sensor unit and from the actuator, the control unit having no sensors responsive to acceleration and being operable to receive information from the sensor unit and to transmit an actuating command to the actuator to activate the safety device.

17 Claims, 2 Drawing Sheets

U.S. PATENT DOCUMENTS

| | | | |
|---|---|---|---|
| 5,935,182 A | 8/1999 | Foo et al. | |
| 5,950,973 A * | 9/1999 | Verma | 248/222.51 |
| 5,967,548 A * | 10/1999 | Kozyreff | 280/735 |
| 5,977,653 A * | 11/1999 | Schmid et al. | 307/10.1 |
| 6,032,092 A | 2/2000 | Laaser | |
| 6,095,554 A | 8/2000 | Foo et al. | |
| 6,113,138 A * | 9/2000 | Hermann et al. | 280/735 |
| 6,145,389 A * | 11/2000 | Ebeling et al. | 73/865.4 |
| 6,198,997 B1 * | 3/2001 | Ishikawa et al. | 701/45 |
| 6,243,632 B1 | 6/2001 | Jung | |
| 6,249,730 B1 | 6/2001 | Khairallah et al. | |
| 6,390,498 B1 | 5/2002 | Francis et al. | |
| 6,459,366 B1 * | 10/2002 | Foo et al. | 340/436 |
| 6,522,992 B1 * | 2/2003 | McCall et al. | 702/141 |
| 2001/0040065 A1 | 11/2001 | Takage et al. | |
| 2002/0084636 A1 * | 7/2002 | Lewallen et al. | 280/735 |
| 2002/0145273 A1 | 10/2002 | Foo et al. | |
| 2002/0147533 A1 | 10/2002 | Foo et al. | |
| 2002/0152012 A1 | 10/2002 | Watson et al. | |

FOREIGN PATENT DOCUMENTS

| | | |
|---|---|---|
| DE | 19740019 A1 | 3/1999 |
| DE | 19609290 A1 | 4/1999 |
| DE | 19945923 A1 | 5/2000 |
| DE | 10015267 A1 | 10/2001 |
| DE | 10114504 A1 | 10/2002 |
| EP | 0 548 849 A1 | 6/1993 |
| EP | 0 785 112 A1 | 7/1997 |
| EP | 0 806 594 A | 11/1997 |
| EP | 1 164 317 A | 12/2001 |
| EP | 1 213 515 A | 6/2002 |
| GB | 2 270 183 A | 3/1994 |
| GB | 2 292 126 A | 2/1996 |
| GB | 2292126 A * | 2/1996 |
| GB | 2 293 681 A | 4/1996 |
| GB | 2 369 473 A | 5/2002 |
| GB | 2 370 671 A | 7/2002 |
| GB | 2370671 A * | 7/2002 |
| JP | 11348715 A | 12/1999 |
| JP | 2002293208 A | 10/2002 |
| WO | WO96/27514 | 9/1996 |
| WO | WO 96/30231 | 10/1996 |
| WO | WO98/06604 A1 | 2/1998 |
| WO | WO 01/23224 A1 | 4/2001 |

OTHER PUBLICATIONS

European Search Report—EP 04 00 8398 (mailed on Jun. 9, 2004).

* cited by examiner

SAFETY ARRANGEMENT FOR A VEHICLE USING SEPARATE SENSING AND CONTROL UNITS

CROSS REFERENCE TO RELATED APPLICATION

This application claims priority to PCT/SE2003/001622, filed Oct. 21, 2003, GB 0 224 429.1, filed Oct. 21, 2002, and GB 0 228 054.3, filed Dec. 2, 2002.

FIELD OF THE INVENTION

This invention relates to a safety arrangement for a vehicle, and in particular concerns an improved arrangement for detecting a crash situation and controlling at least one safety device, such as an air-bag.

BACKGROUND OF THE INVENTION

Modern vehicle safety systems typically comprise a main control unit, which is the hub of the system. The main control unit comprises one or more accelerometers to measure the rate of change of velocity of the vehicle, a processor operable to perform a decision algorithm on the signals output by the accelerometers in order to establish whether a crash situation has occurred and implement a crash algorithm to activate one or more safety devices accordingly, an energy source, normally in the form of one or more capacitors, storing sufficient ignition energy to activate the safety device, and an ignition circuit, which is controlled by the output of the crash algorithm, and which connects the capacitor(s) to the safety device(s) to deploy the safety device(s) upon detection of a crash situation. The control unit may also comprise means for controlling the communications between the control unit and various external units, and have a diagnostic function.

Due to the fact that the control unit comprises accelerometers, the control unit must be physically located in a part of the vehicle where the sensed acceleration will be representative of the acceleration of the vehicle as a whole. The ideal location for this purpose is the central tunnel of the vehicle, which comprises a ridge running along the centre of the floor of the chassis of the vehicle, and in many known systems the control unit is mounted on an upper surface of the control tunnel, i.e. within the vehicle cabin.

Due to the number of components contained in the control unit, the control unit is rather large and heavy. It may, therefore, be difficult to allocate sufficient space to the control unit on the central tunnel of the vehicle, which typically also carries other components such as the gear stick.

In addition, a heavy control unit will generate substantial vibration while the vehicle is moving, and this is likely to compromise the accuracy of the signal output by accelerometers provided therein.

It is an object of the present invention to alleviate one or more of the above difficulties.

SUMMARY OF THE INVENTION

Accordingly, one aspect of the present invention provides a vehicle safety arrangement, the arrangement includes a sensor unit having at least one sensor responsive to acceleration, the sensor unit being located substantially along a central longitudinal line of the vehicle.

The safety arrangement further includes an actuator for activating a safety device, the actuator being located remotely from the sensor unit; and a control unit located remotely from the sensor unit and from the actuator, the control unit being operable to receive information from the sensor unit and to transmit an actuating command to the actuator to activate the safety device. The control unit of this invention does not have sensors responsive to acceleration, but includes a signal processor for sampling data gathered by sensors of the sensor unit.

Preferably, the sensor unit is located on a central tunnel of the vehicle.

Conveniently, the sensor unit comprises at least two sensors responsive to acceleration, which are configured to measure at least longitudinal and lateral acceleration of the vehicle.

Advantageously, the at least one sensor responsive to acceleration is configured to measure vertical acceleration of the vehicle.

Conveniently, the signal processor is operable to transmit the sampled data to the control unit.

Advantageously, the signal processor is operable to perform a crash algorithm, which causes the signal processor to instruct the control unit to transmit the actuating command to the actuator.

Alternatively, the signal processor is operable to receive the output of a decision algorithm, which determines whether the vehicle is in a crash situation.

Preferably, the decision algorithm is performed in the control unit.

Conveniently, the signal processor is operable to receive data from other remote sensors.

Advantageously, the sensor unit comprises one or more sensors operable to measure an angular velocity of the vehicle around a longitudinal axis thereof.

Preferably, the actuator comprises an ignitor for igniting a charge to activate the safety device.

Conveniently, the control unit comprises one or more capacitors configured to store sufficient energy to cause the actuator to activate the safety device.

Advantageously, the discharge of the one or more capacitors comprises the actuation command.

Preferably, the actuator is located in a unit that also comprises a capacitor configured to store energy to activate the safety device, the capacitor being discharged to activate the safety device in response to the actuation command.

Conveniently, the safety arrangement further comprises at least one left side sensor on a left side of the vehicle and at least one right side sensor on a right side of the vehicle.

Advantageously, the control unit is connected to a main battery of the vehicle, and supplies power to the sensor unit and the actuator.

Preferably, the sensor unit has a smaller volume than that of the control unit.

Conveniently, the sensor unit has a volume less than half that of the control unit.

Advantageously, the sensor unit has a smaller mass than that of the control unit.

Preferably, the mass of the sensor unit is less than half that of the control unit.

Conveniently, the sensor unit is provided on a single microchip.

Advantageously, the sensor unit comprises a processor.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE INVENTION

Figure 1:
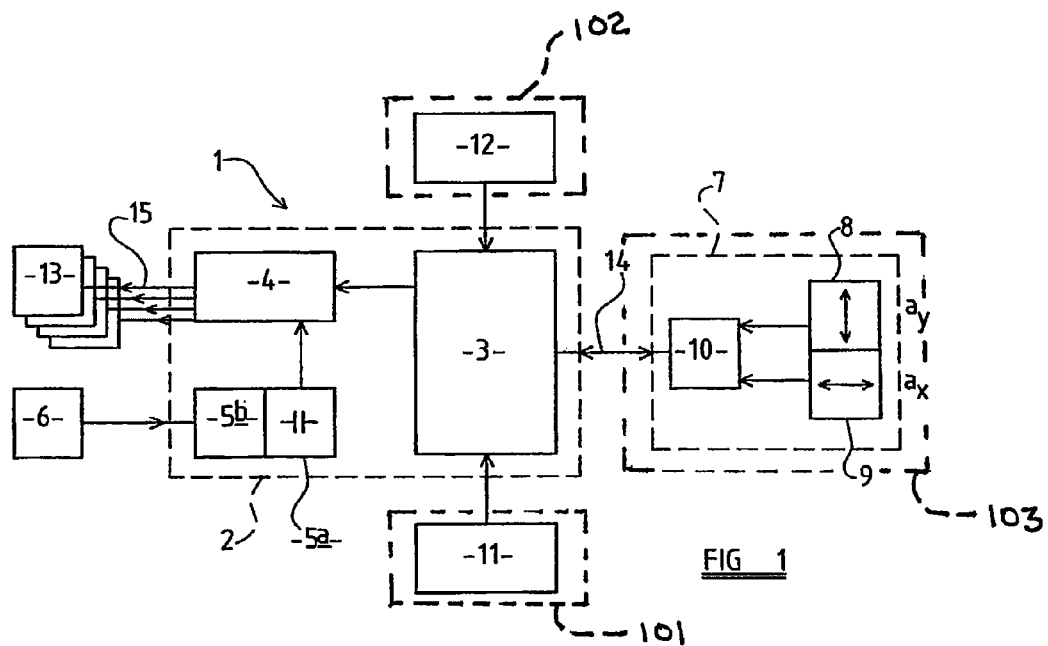
FIG. 1 shows a first safety arrangement embodying the present invention.

Referring to FIG. 1, a schematic representation of a first safety arrangement 1 embodying the present invention is shown. The first safety arrangement 1 comprises a control unit 2 which has a processor 3. The processor 3 is, as discussed above, operable to apply a decision algorithm to signals received from sensors (described below), to determine from these signals whether a crash situation has occurred. Such algorithms are known in the art.

The control unit 2 further comprises an ignition circuit 4, which is operable to send an actuation command (in this case in the form of an ignition energy pulse) to a safety device of the vehicle, for instance an air-bag, as will be described in more detail below. The ignition circuit 4 is connected to one or more substantial capacitors 5a, which are charged with sufficient energy to activate the safety device, and will transmit the stored energy to the safety device upon receipt of a trigger signal from the processor 3. Alternatively, the ignition energy could be taken directly from the vehicle battery, although the battery may become disconnected from the safety arrangement 1, which could result in a failure of the safety device to deploy.

Finally, the control unit 2 comprises a voltage regulator 5b, which receives power from the vehicle battery 6, or from an alternative power source, and regulates the voltage for charging the capacitors but could also provide power to the processor 3, and other components of the first safety arrangement 1.

It will be appreciated that the control unit 2 will be relatively large and heavy, particularly due to the presence of the capacitors and the ignition circuit 4, which normally comprises two switches for each safety device. The switches are respectively closed in response to an arming signal and to the trigger signal.

The safety arrangement 1 further comprises a sensor unit 7, which comprises a pair of accelerometers 8 and 9 one of which is orientated so as to measure longitudinal acceleration $a_x$ of the vehicle, and the other of which is orientated to measure lateral acceleration $a_y$ of the vehicle. The sensor unit 7 comprises a signal processor 10, which receives outputs from the accelerometers 8 and 9 and manipulates the data to be in a suitable form for feeding to the processor 3 of the control unit 2.

Left and right sensors 11 and 12 respectively (which may also be accelerometers) are also provided, separately from the sensor unit 7, and the left and right sensors 11 and 12 are configured to be located on respective left and right hand sides 101 and 102 (schematically illustrated) of the vehicle to provide additional information that may be useful in determining whether or not the vehicle has encountered a crash situation, or in providing information on the type of crash that has occurred.

The safety arrangement 1 also comprises one or more actuators 13, in the form (in this example) of squibs or other devices such as relays which, upon activation thereof may, by way of example, inflate air-bags and release belt pre-tensioners.

As discussed above, it is important for the sensor unit 7 to be physically located on the vehicle in a position where the sensed acceleration will be representative of the acceleration of the vehicle as a whole. Hence, the sensor unit 7 is positioned substantially along a central longitudinal line of the vehicle. In advantageous embodiments of the invention, the sensor unit 7 is located on the central tunnel 103 (schematically illustrated) of the vehicle, and in such embodiments the sensor unit 7 may be directly attached by any suitable means to an upper or lower surface of the central tunnel, or to a covering thereof. The sensor unit 7 may be located within the cabin of the vehicle.

However, the control unit 2, which comprises rather heavier components, is located remotely from the sensor unit 7 and indeed may be placed in any suitable location on the vehicle, not necessarily anywhere near the central longitudinal line thereof (e.g. on a different part of the tunnel or behind the dashboard).

The control unit 2 communicates with the sensor unit 7 over a sensor communication line 14, which may take any suitable form.

The remote location of the control unit 2 from the sensor unit 7 means that it is not necessary to house the control unit 2 in the central tunnel of the vehicle, thus alleviating the difficulty discussed above.

In addition, the relatively large vibrations that the control unit 2 will undergo during movement of the vehicle will not affect the sensor unit 7, which will therefore provide more reliable data regarding the acceleration of the vehicle.

The control unit 2 is also located remotely from the actuator 13, and communicates therewith over an activation communication line 15. As discussed above, the control unit 2 comprises an ignition circuit 4 connected to capacitors 5a charged with sufficient energy to activate the actuator 13 (for instance, to activate one or more ignitors to ignite the squibs), and in this embodiment the activation communication line 15 may simply comprise a power line, with the control unit 2 initiating activation of the actuator 13 by discharging the capacitors along the power line.

It will be appreciated that, with the above arrangement, the volume and mass of the components that are located in the sensor unit 7 on the central tunnel of the vehicle are kept to an absolute minimum, with the larger, more massive components being conveniently located elsewhere in the vehicle in the control unit 2.

Figure 2:
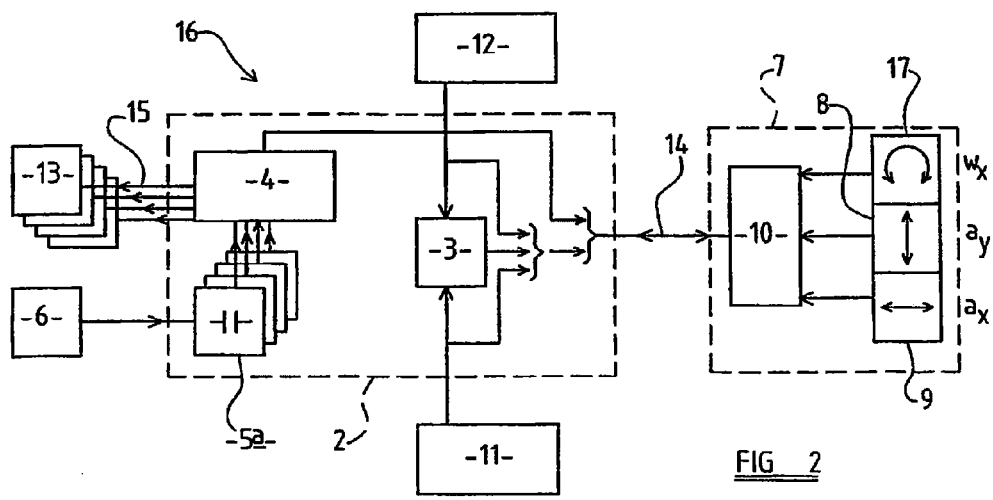
FIG. 2 shows a second safety arrangement embodying the present invention.

FIG. 2 shows a second safety arrangement 16 embodying the present invention. Common components between the first safety arrangement 1 discussed above and the second safety arrangement 16 are designated by like reference numerals.

In the second safety arrangement 16, the processing unit 3 in the control unit 2 receives data from the left and right sensors 11,12, and performs signal processing, the output of which is sent to the signal processor 10, which now implements the main crash algorithm and hence decides whether the safety device is to be deployed. The signal processor 10 will, upon receiving a signal from the processing unit 3, perform the crash algorithm, and will (if appropriate) instruct the ignition circuit 4 to send an actuation command to the actuators 13.

The second safety arrangement 16 also comprises a third sensor 17 in the sensor unit 7, this third sensor 17 being position to allow measurement of movement of the vehicle around the roll axis (angular velocity, $\omega_x$). Components of second safety arrangement 16, along with additional embodiments described below, include components common with those of the first safety arrangement 1, and are identified by like reference numbers.

Figure 3:
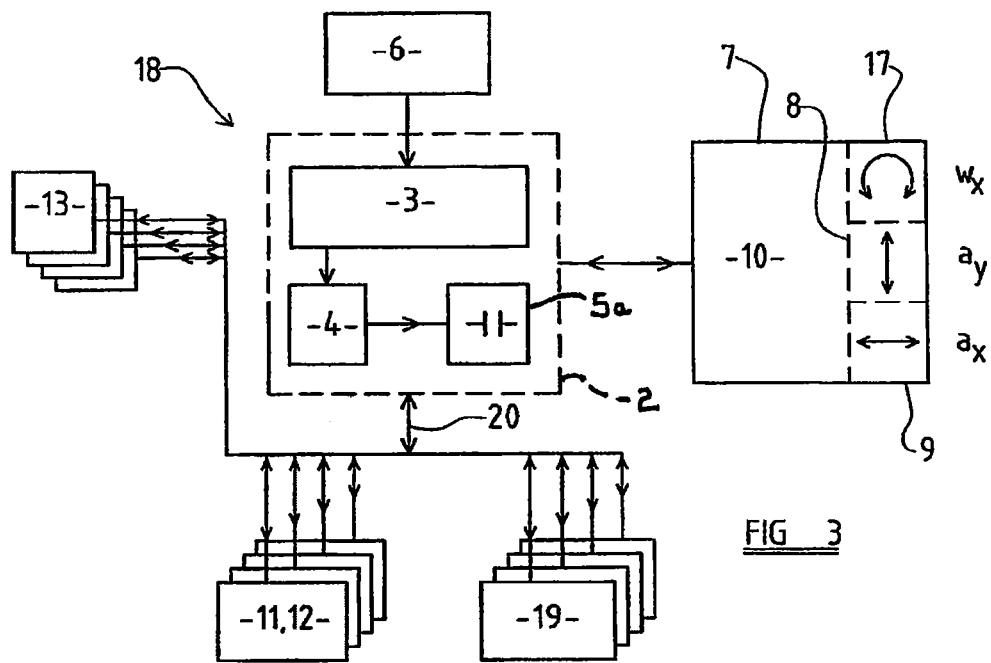
FIG. 3 shows a third safety arrangement embodying the present invention.

FIG. 3 shows a third safety arrangement 18 embodying the present invention. The third safety arrangement 18 comprises further sensors 19, which measure parameters of the car other than the acceleration thereof. For instance, the further sensors 19 may detect whether seat belt buckles are engaged, or may otherwise detect the presence of an occupant in a given seat of the vehicle, for instance by the weight exerted on the seat, or may measure the position of the seat or a part thereof (such as the headrest). The further sensors 19 may also gather information relating to the speed of the vehicle. The information output by the further sensors 19 is passed to the control unit 2 via an information bus 20, which allows communication between the control unit 2 and any other remote crash sensors (for instance the left and right sensors 11 and 12) and the actuator 13.

The information gathered by the further sensors 19 allows the processor 3 of the control unit 2 to arrive at a more informed decision regarding whether to activate the safety device. For instance, if the further sensors 19 detect that the passenger seat of the vehicle is unoccupied during a crash, the control unit 2 may prevent the triggering of a passenger-side air-bag, since this is unlikely to offer protection to the occupants of the vehicle, and may hinder efforts to leave the vehicle, or remove people from the vehicle, following a crash.

Also, in the third safety arrangement 18, the sensor unit 7 is provided on a single microchip, and it will be appreciated that this arrangement further reduces the size and mass of the components that are to be located in the central tunnel of the vehicle.

Figure 4:
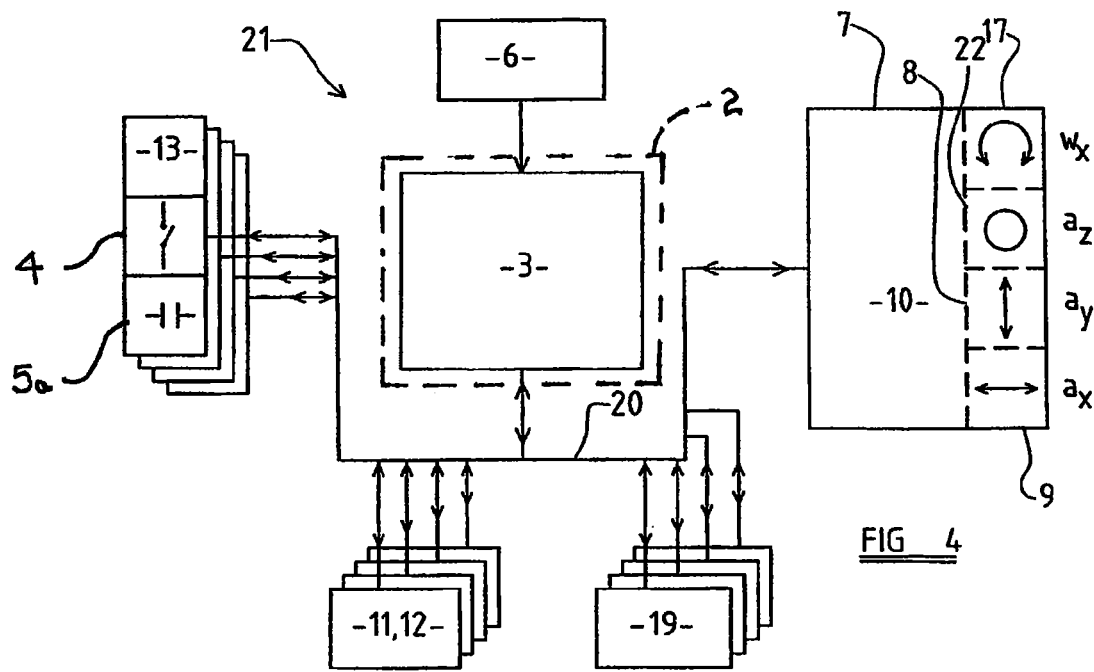
FIG. 4 shows a fourth safety arrangement embodying the present invention.

With reference to FIG. 4, a fourth safety arrangement 21 embodying the present invention is shown. The fourth safety arrangement 21 is similar to the third safety arrangement 18, however each safety device is provided with a unit comprising a capacitor 5a, an ignition circuit 4 and an actuator 13, and the information bus 20 continuously transmits power from the control unit 2 to the capacitors and other remote units of the arrangement 21, including for instance the sensor unit 7. The bus 20 also transmits the actuation command, now in form of a trigger signal, from the processor 3 to the ignition circuits. If an arming switch is used in circuit 4, an arming signal will also be sent. The sensor unit could also comprise a vertical accelerometer 22 to measure vertical acceleration $a_z$.

It will be understood that the present invention provides an improved safety arrangement, providing favourable distribution of components around a vehicle, while improving the accuracy with which a crash situation may be detected.

As a person skilled in the art will readily appreciate, the above description is meant as an illustation of the implementation of the principles of this invention. This description is not intended to limit the scope or application of this invention in that the invention is susceptible to modificatioon, variation and change, without departing from the spirit of this invention, as defined in the following claims.

The invention claimed is:

1. A vehicle safety arrangement for a vehicle, the arrangement comprising:
   a sensor unit comprising at least one sensor responsive to acceleration, the sensor unit being located substantially along a central longitudinal line of the vehicle, the sensor unit having a signal processor for sampling data gathered by the at least one sensor;
   an actuator for activating a safety device, the actuator being located remotely from the sensor unit; and
   a control unit located remotely from the sensor unit and from the actuator and away from the central longitudinal line, the control unit being operable to receive sensor signals from remote sensors located away from the sensor unit and the control unit and to provide data from the remote sensors to the signal processor of the sensor unit for performing a crash algorithm, the control unit being operable to receive information from the sensor unit and to transmit an actuation command to the actuator to activate the safety device, wherein the control unit comprises no sensor responsive to acceleration;
   wherein the signal processor operates to perform the crash algorithm, which causes the signal processor to instruct the control unit to transmit the actuation command to the actuator.

2. A safety arrangement according to claim 1, wherein the sensor unit is located on a central tunnel of the vehicle.

3. A safety device according to claim 1, wherein the sensor unit comprises at least two sensors responsive to acceleration, which are configured to measure at least longitudinal and lateral acceleration of the vehicle.

4. A safety arrangement according to claim 1, wherein the at least one sensor responsive to acceleration is configured to measure vertical acceleration of the vehicle.

5. A safety arrangement according to claim 1, wherein the signal processor is operable to receive data from additional remote sensors.

6. A safety arrangement according to claim 1, wherein the sensor unit comprises one or more sensors operable to measure an angular velocity of the vehicle around a longitudinal axis thereof.

7. A safety arrangement according to claim 1, wherein the actuator comprises an ignitor for igniting a charge to activate the safety device.

8. A safety arrangement according to claim 1, wherein the control unit comprises one or more capacitors configured to store sufficient energy to cause the actuator to activate the safety device.

9. A safety arrangement according to claim 8, wherein the discharge of the one or more capacitors comprises the actuation command.

10. A safety arrangement according to claim 1, wherein at least one actuator is located in a unit that also comprises a capacitor configured to store energy to activate the safety device, the capacitor being discharged to activate the safety device in response to the actuation command.

11. A safety arrangement according to claim 1, further comprising at least one left side sensor on a left side of the vehicle and at least one right side sensor on a right side of the vehicle.

12. A safety arrangement according to claim 1, wherein the control unit is connected to a main battery of the vehicle, and supplies power to the sensor unit and to the actuator.

13. A safety arrangement according to claim 1, wherein the sensor unit has a smaller volume than that of the control unit.

14. A safety arrangement according to claim 1, wherein the sensor unit has a volume less than half that of the control unit.

15. A safety arrangement according to claim 1, wherein the sensor unit has a smaller mass than that of the control unit.

16. A safety arrangement according to claim 15, wherein the mass of the sensor unit is less than half that of the control unit.

17. A safety arrangement according to claim 1, wherein the sensor unit is provided on a single microchip.

* * * * *